United States Patent
Murata et al.

(10) Patent No.: US 10,858,972 B2
(45) Date of Patent: Dec. 8, 2020

(54) OIL PRESSURE CONTROL DEVICE

(71) Applicant: ISUZU MOTORS LIMITED, Tokyo (JP)

(72) Inventors: Yuuichi Murata, Yamato (JP); Ken Suzuki, Yamato (JP); Kouji Hashimoto, Yokohama (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 16/463,918

(22) PCT Filed: Nov. 22, 2017

(86) PCT No.: PCT/JP2017/041915
§ 371 (c)(1),
(2) Date: May 24, 2019

(87) PCT Pub. No.: WO2018/097151
PCT Pub. Date: May 31, 2018

(65) Prior Publication Data
US 2019/0390579 A1 Dec. 26, 2019

(30) Foreign Application Priority Data
Nov. 25, 2016 (JP) ................. 2016-229138

(51) Int. Cl.
F01M 5/00 (2006.01)
F01M 1/16 (2006.01)
(Continued)

(52) U.S. Cl.
CPC ............ F01M 1/16 (2013.01); F01M 1/20 (2013.01); F01M 5/002 (2013.01); F01M 7/00 (2013.01);
(Continued)

(58) Field of Classification Search
CPC ....... F01P 11/08; F01P 2060/04; F16D 25/14; F16D 48/02
(Continued)

(56) References Cited

U.S. PATENT DOCUMENTS 5,339,776 A    8/1994  Regueiro
8,375,917 B1 * 2/2013  Neal ..................... F01P 3/20
                                                    123/196 AB
(Continued)

FOREIGN PATENT DOCUMENTS

JP    59-028613 U    2/1984
JP    59-167904 U   11/1984
(Continued)

OTHER PUBLICATIONS

International Search Report from International Application No. PCT/JP2017/041915 dated Dec. 26, 2017.
(Continued)

Primary Examiner — Long T Tran
Assistant Examiner — James J Kim
(74) Attorney, Agent, or Firm — Brundidge & Stanger, P.C.

(57) ABSTRACT

This oil pressure control device is provided with: an oil cooler which cools engine oil circulating through a hydraulic circuit of an engine; a bypass oil passage which bypasses the oil cooler; an oil cooler bypass valve by means of which an engine oil flow passage is switched between the oil cooler and the bypass oil passage; an oil pressure sensor which measures a first oil pressure, which is the oil pressure of engine oil; and a valve control unit which controls opening and closing of the oil cooler bypass valve to reduce the magnitude of a difference between the first oil pressure and
(Continued)

a second oil pressure, which is a target oil pressure determined on the basis of the rotational speed of the engine and a fuel injection quantity.

5 Claims, 3 Drawing Sheets

(51) Int. Cl.
*F01M 1/20* (2006.01)
*F01M 7/00* (2006.01)
*F01P 11/08* (2006.01)

(52) U.S. Cl.
CPC ........ *F01P 11/08* (2013.01); *F02D 2200/023* (2013.01); *F02D 2200/024* (2013.01)

(58) Field of Classification Search
USPC .................................................. 123/196 AB
See application file for complete search history.

(56) References Cited

U.S. PATENT DOCUMENTS

| | | | | |
|---|---|---|---|---|
| 8,939,132 | B2* | 1/2015 | Tanaya | F02P 15/005 123/634 |
| 2004/0031463 | A1 | 2/2004 | Williams et al. | |
| 2013/0151113 | A1* | 6/2013 | Chung | F01M 1/16 701/102 |
| 2014/0317923 | A1* | 10/2014 | Neal | F01M 5/00 29/888.011 |
| 2017/0248065 | A1* | 8/2017 | Liu | F01P 5/12 |
| 2017/0268587 | A1* | 9/2017 | Ono | F16D 25/14 |
| 2018/0230870 | A1* | 8/2018 | Zwickler | F04C 2/3442 |
| 2018/0274406 | A1* | 9/2018 | Dries | F16H 57/0417 |
| 2018/0274564 | A1* | 9/2018 | Diges | F16H 57/0436 |

FOREIGN PATENT DOCUMENTS

| | | |
|---|---|---|
| JP | 10-288022 A | 10/1998 |
| JP | 2004-003480 A | 1/2004 |
| JP | 2010-203263 A | 9/2010 |
| JP | 2010-216411 A | 9/2010 |
| JP | 2013-007306 A | 1/2013 |
| JP | 2014-015898 A | 1/2014 |
| WO | 2014/073444 A1 | 5/2014 |

OTHER PUBLICATIONS

Extended EP Search Report from EP Application No. 17873738.3 dated Oct. 31, 2019, 8 pages.

* cited by examiner

| FUEL INJECTION QUANTITY (mm³/st) | TARGET OIL PRESSURE (kPa) | | | | | | | | | | | | |
|---|---|---|---|---|---|---|---|---|---|---|---|---|---|
| 250 | 130 | 150 | 190 | 230 | 318 | 420 | 466 | 550 | 550 | 550 | 550 | 550 | 550 |
| 230 | 130 | 150 | 190 | 230 | 318 | 420 | 466 | 550 | 550 | 550 | 550 | 550 | 550 |
| 220 | 130 | 150 | 190 | 230 | 300 | 400 | 445 | 550 | 550 | 550 | 550 | 550 | 550 |
| 210 | 130 | 150 | 190 | 230 | 290 | 360 | 420 | 550 | 550 | 550 | 550 | 550 | 550 |
| 200 | 130 | 150 | 190 | 230 | 270 | 340 | 403 | 550 | 550 | 550 | 550 | 550 | 550 |
| 175 | 130 | 150 | 190 | 230 | 270 | 340 | 403 | 520 | 550 | 550 | 550 | 550 | 550 |
| 150 | 130 | 150 | 190 | 230 | 270 | 340 | 403 | 440 | 490 | 550 | 550 | 550 | 550 |
| 125 | 130 | 150 | 190 | 230 | 270 | 340 | 403 | 440 | 450 | 550 | 550 | 550 | 550 |
| 100 | 130 | 150 | 190 | 230 | 270 | 340 | 403 | 440 | 450 | 470 | 500 | 490 | 550 |
| 0 | 0 | 0 | 0 | 0 | 0 | 0 | 0 | 450 | 460 | 470 | 480 | 490 | 550 |
| | 450 | 600 | 800 | 1000 | 1200 | 1400 | 1600 | 1800 | 2000 | 2200 | 2400 | 2600 | 2800 |
| | ENGINE SPEED (rpm) | | | | | | | | | | | | |

FIG. 3

OIL PRESSURE CONTROL DEVICE

TECHNICAL FIELD

The present disclosure relates to an oil pressure control apparatus.

BACKGROUND ART

Hydraulic circuits are used for cooling and lubricating engine members. Engine oil that circulates in a hydraulic circuit cools and lubricates the engine members, such as bearings and the like (e.g., a connecting rod bearing and a main bearing). In order to cool and lubricate the engine members sufficiently, it is necessary to control the oil pressure of the engine oil to maintain a proper oil pressure. When the oil pressure of the engine oil becomes lower than the proper oil pressure due to a malfunction caused in the hydraulic circuit, there arises a problem of a decrease in durability reliability of each of the engine members.

Examples of such a malfunction of the hydraulic circuit include sticking and failure of a relief valve attached to an oil pump. The oil pump circulates the engine oil in the hydraulic circuit. The relief valve reduces the oil pressure by opening a relief orifice to discharge excessive engine oil from the relief orifice when the oil pressure of the engine oil flowing into the oil pump reaches a threshold. That is, the normally functioning relief valve reduces an unusual rise in oil pressure of the engine oil flowing into the oil pump, and functions to maintain the proper oil pressure. However, when the sticking or failure of the relief valve is caused somehow, the oil pressure of the engine oil is caused to be lower than the proper oil pressure.

When the oil pressure of the engine oil is lower than the proper oil pressure, it is necessary, for example, to increase the oil pressure by lowering the oil temperature. A configuration in which an oil cooler and a bypass channel are disposed between an oil pump and an oil gallery, and a thermo-pressure valve that closes only when the oil temperature is high and the oil pressure is low is disposed in the bypass channel is proposed as a configuration to raise the oil pressure by lowering the oil temperature (see Patent Literature (hereinafter referred to as "PTL") 1).

CITATION LIST

Patent Literature

PTL 1

Japanese Patent Application Laid-Open No. SHO59-28613

SUMMARY OF INVENTION

Technical Problem

Generally, the proper oil pressure of the engine oil depends on an engine speed, fuel injection quantity, and/or the like. Therefore, in order to control such that the proper oil pressure is always maintained by lowering the oil temperature of the engine oil, it is necessary to determine whether or not to lower the oil temperature depending on the engine speed and fuel injection quantity.

However, in the configuration of PTL 1, the engine oil flows through the oil cooler and is cooled only during normal traveling in which the oil temperature is high and the oil pressure is low. That is, when the oil temperature is low, for example, the engine oil is not cooled and the oil pressure is not raised. Therefore, there is a problem in that the oil pressure of the engine oil cannot be the proper oil pressure when the oil temperature is low.

An object of the present disclosure is to provide an oil pressure control apparatus which makes it possible to secure a proper oil pressure of engine oil even when the oil temperature is low.

Solution to Problem

An oil pressure control apparatus according to one aspect of the present disclosure is configured to include: an oil cooler that cools engine oil that circulates in a hydraulic circuit of an engine; a bypass oilway that bypasses the oil cooler; an oil-cooler bypassing valve that switches a channel of the engine between a channel through the oil cooler and a channel through the bypass oilway; an oil pressure sensor that measures a first oil pressure that is an oil pressure of the engine oil; and a valve control section that controls opening and closing of the oil-cooler bypassing valve so as to reduce a magnitude of a difference value between the first oil pressure and a second oil pressure that is a target oil pressure determined based on an engine speed and a fuel injection quantity of the engine.

Advantageous Effects of Invention

According to the present disclosure, an oil pressure control apparatus which makes it possible to secure a proper oil pressure of engine oil even when the oil temperature is low can be provided.

BRIEF DESCRIPTION OF DRAWINGS

FIG. 3 shows an example of a lookup table for target oil pressures used in the oil pressure control apparatus of the present disclosure.

DESCRIPTION OF EMBODIMENTS

Hereinafter, an embodiment of the present disclosure will be described in detail with reference to the accompanying drawings.

Embodiment

Figure 1:
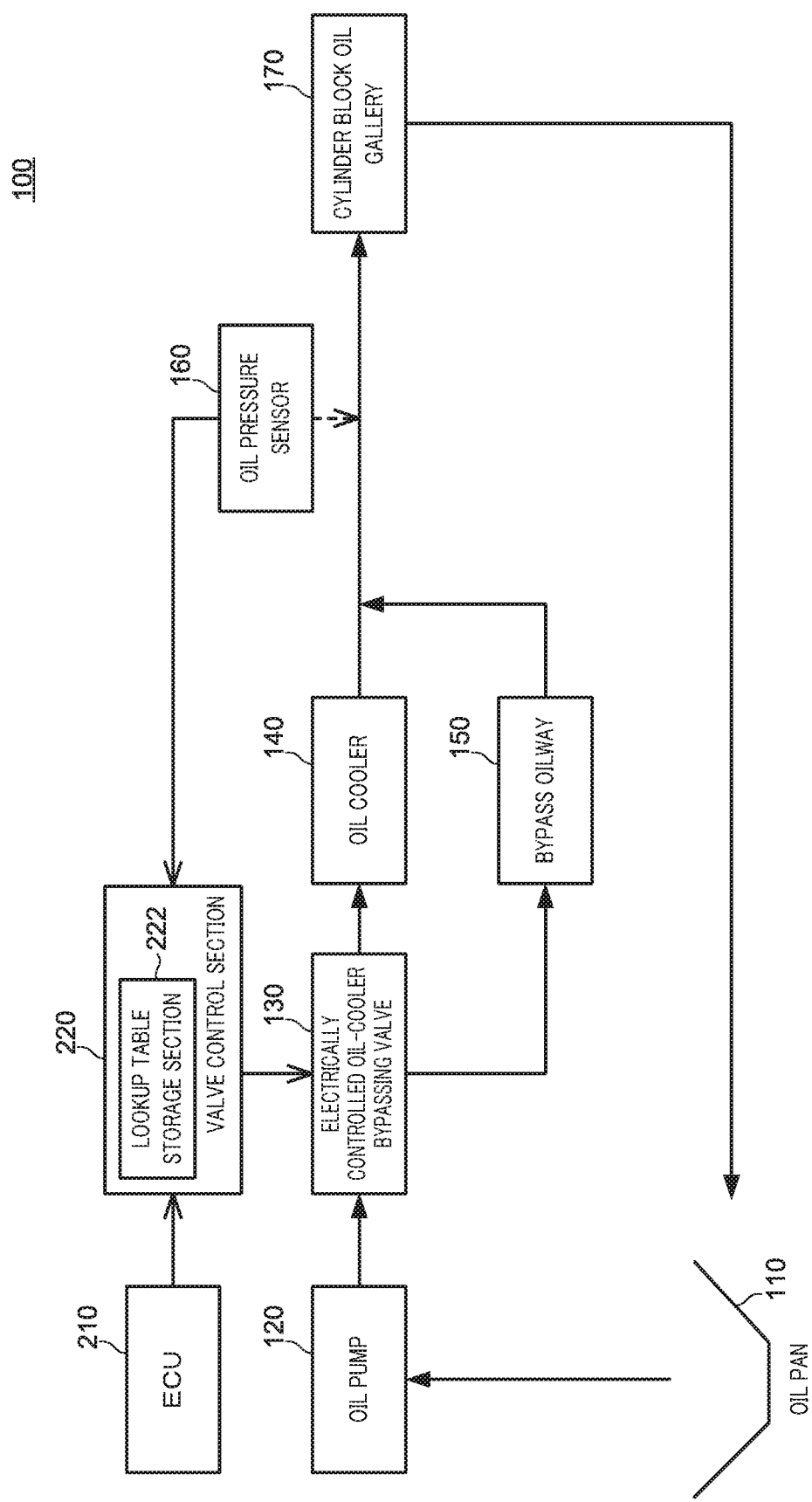
FIG. 1 illustrates a configuration of an oil pressure control apparatus of the present disclosure.

FIG. 1 illustrates a configuration of oil pressure control apparatus 100 of the present disclosure. An engine oil flow in a hydraulic circuit and an electrical signal flow in oil pressure control apparatus 100 are indicated by respective different types of arrows in FIG. 1.

To begin with, a description will be given of the engine oil flow in the hydraulic circuit illustrated in FIG. 1. FIG. 1 illustrates that engine oil is sucked from oil pan 110 through an oil strainer (not illustrated) to oil pump 120.

The engine oil coming out of oil pump 120 is sent under pressure to electrically controlled oil-cooler bypassing valve 130. When electrically controlled oil-cooler bypassing valve 130 is open, the engine oil is sent under pressure to oil cooler 140, and is then sent under pressure to cylinder block oil gallery 170 after cooled by oil cooler 140. On the other hand, when electrically controlled oil-cooler bypassing valve 130 is closed, the engine oil is sent under pressure to bypass oilway 150, and is then sent under pressure to cylinder block oil gallery 170 without flowing through oil cooler 140. In this case, the engine oil is not cooled by oil cooler 140.

The engine oil sent under pressure to cylinder block oil gallery 170 is supplied to a piston, cam head, main bearing, and connecting rod bearing (none of them are illustrated), which are engine members, and serves to lubricate these members. Part of the engine oil is supplied to the piston as an oil jet, and also serves to cool the piston. Then, the engine oil is returned to oil pan 110.

Next, a description will be given of a configuration related to electrical control (electrically controlled) in oil pressure control apparatus 100 illustrated in FIG. 1. Oil pressure sensor 160 measures the oil pressure of the engine oil, and generates information indicating the oil pressure of the engine oil based on a measured result. Since oil pressure control apparatus 100 controls the oil pressure of the engine oil based on the result of measurement by oil pressure sensor 160, it is preferable that oil pressure sensor 160 be disposed at a position in the hydraulic circuit where it is necessary to secure the oil pressure. By way of an example, oil pressure sensor 160 is disposed downstream of oil cooler 140 and bypass oilway 150. Oil pressure sensor 160 is disposed in cylinder block oil gallery 170, for example.

Valve control section 220 is electrically connected to oil pressure sensor 160, and obtains the information indicating the oil pressure of the engine oil from oil pressure sensor 160. Further, valve control section 220 is electrically connected to ECU (engine control unit or electronic control unit) 210, and obtains information indicating the engine speed and the fuel injection quantity of the engine from ECU 210.

Valve control section 220 determines opening and closing of electrically controlled oil-cooler bypassing valve 130 based on the oil pressure of the engine oil. By way of an example, valve control section 220 determines a target oil pressure of the engine oil based on the engine speed and the fuel injection quantity, and determines the opening and closing of electrically controlled oil-cooler bypassing valve 130 based on a difference value between the target oil pressure and the measured oil pressure.

By way of an example, valve control section 220 is provided with lookup table storage section 222. Lookup table storage section 222 stores therein a lookup table specifying target oil pressures corresponding respectively to engine speeds and fuel injection quantities. For example, valve control section 220 determines the target oil pressure of the engine oil corresponding to the engine speed and the fuel injection quantity using the information indicating the engine speed and the fuel injection quantity obtained from ECU 210 and using the lookup table read out from lookup table storage section 222. By way of an example, the target oil pressure of the engine oil is determined using linear interpolation in a case of an engine speed and a fuel injection quantity which do not exist in the lookup table.

Figure 2:
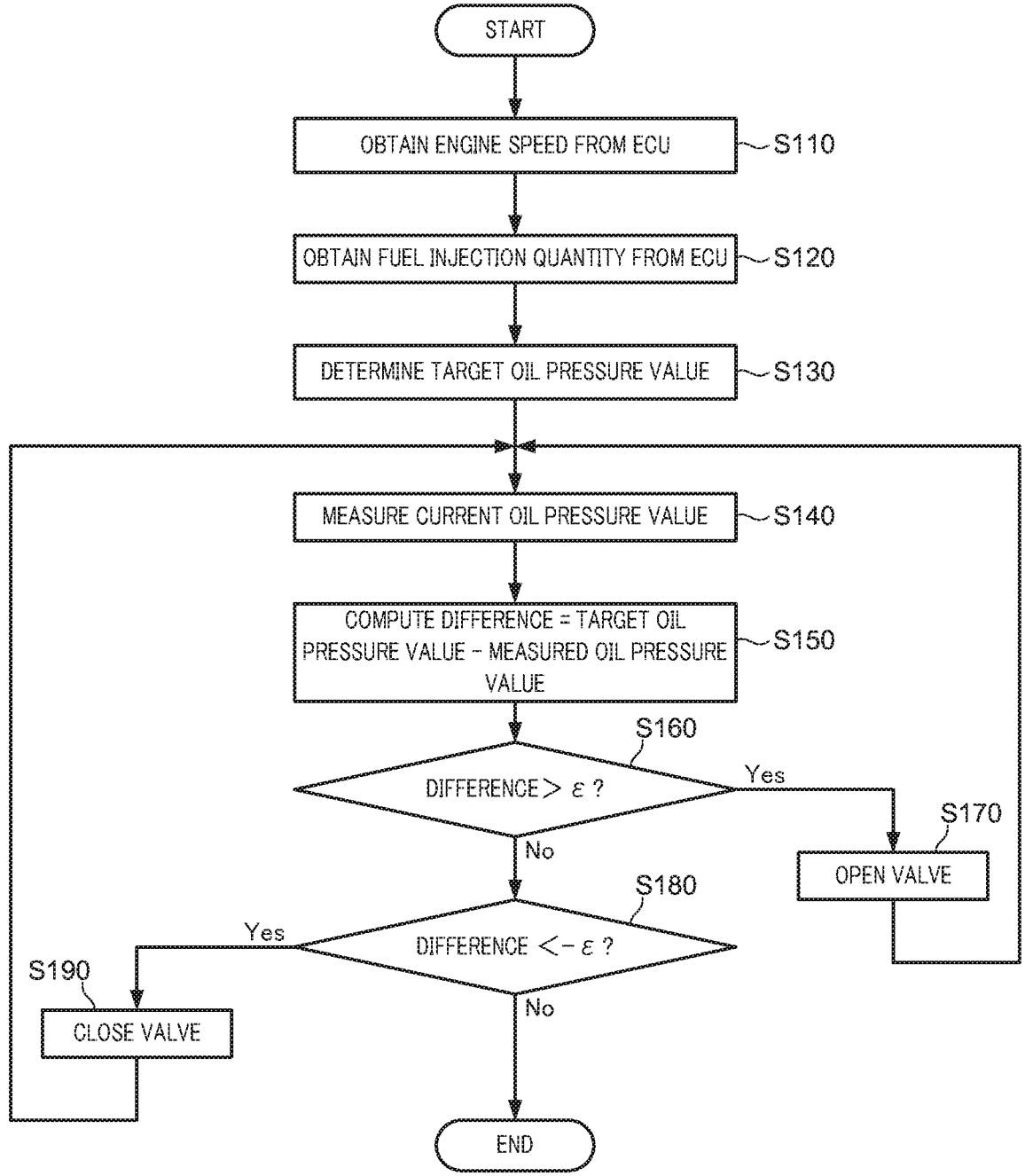
FIG. 2 is a flowchart for explaining processing by the oil pressure control apparatus of the present disclosure.

FIG. 2 is a flowchart for explaining processing by oil pressure control apparatus 100 of the present disclosure. The processing of the flowchart illustrated in FIG. 2 is implemented, for example, by a program stored in a ROM (not illustrated) being read out and executed by a CPU (not illustrated) in oil pressure control apparatus 100 upon starting the engine of a vehicle. By way of an example, the processing of the flowchart illustrated in FIG. 2 is executed periodically (e.g., once per minute).

To begin with, valve control section 220 obtains the information indicating the engine speed from ECU 210 (step S110). Next, valve control section 220 obtains the information indicating the fuel injection quantity from ECU 210 (step S120).

Next, valve control section 220 determines the target oil pressure (step S130). For example, valve control section 220 determines the target oil pressure of the engine oil corresponding to the engine speed and the fuel injection quantity using the information indicating the engine speed and the fuel injection quantity obtained from ECU 210 and using the lookup table read out from lookup table storage section 222.

FIG. 3 shows an example of the lookup table for the target oil pressures used in oil pressure control apparatus 100 of the present disclosure. The lookup table illustrated in FIG. 3 is a lookup table created by measuring oil pressures in a case of a normal oil flow and in a case of an oil temperature of 80 degrees Celsius and by recording the measured oil pressures for combinations of engine speeds and fuel injection quantities.

For example, let us suppose that the engine speed obtained from ECU 210 is 1000 rpm, and the fuel injection quantity obtained from ECU 210 is 175 $mm^3$/st. The lookup table shows that the target oil pressure corresponding to the engine speed of 1000 rpm and the fuel injection quantity of 175 $mm^3$/st is 270 kPa. Accordingly, valve control section 220 determines that the target oil pressure is 270 kPa.

Oil pressure sensor 160 measures the oil pressure of the engine oil and generates the information indicating the measured oil pressure (step S140). Then, valve control section 220 obtains the information indicating the measured oil pressure from oil pressure sensor 160.

Then, valve control section 220 computes a difference value by subtracting the measured oil pressure from the target oil pressure (step S150). For example, when the measured oil pressure is 245 kPa, the difference value is 270 kPa−245 kPa=25 kPa. By way of another example, when the measured oil pressure is 275 kPa, the difference value is 270 kPa−275 kPa=−5 kPa. By way of still another example, when the measured oil pressure is 290 kPa, the difference value is 270 kPa−290 kPa=−20 kPa.

Next, valve control section 220 determines whether or not the difference value is greater than permissible error ε (step S160). Here, permissible error ε is a permissible error used when the measured oil pressure is adjusted to the target oil pressure. By way of an example, permissible error ε is a predetermined proportion (e.g., 5%) of the target oil pressure. For example, when the target oil pressure is 270 kPa, permissible error ε is 270 kPa×5%=13.5 kPa.

When a determination result indicates that the difference value is greater than permissible error ε (step S160: Yes), the processing proceeds to step S170. For example, when the measured oil pressure is 245 kPa, the difference value is 25 kPa and is greater than permissible error c=13.5 kPa. Therefore, the processing proceeds to step S170 in this case.

Valve control section 220 opens electrically controlled oil-cooler bypassing valve 130 at step S170. Then, the processing proceeds to step S140. By way of an example, in order for the oil cooled by oil cooler 140 to fully permeate the engine after electrically controlled oil-cooler bypassing valve 130 is opened, a predetermined wait time is elapsed before the processing proceeds to step S140.

In the meanwhile, when the difference value is not greater than permissible error E (step S160: No), the processing proceeds to step S180. For example, when the measured oil pressure is 275 kPa, the difference value is −5 kPa and is not greater than permissible error ε=13.5 kPa. Therefore, the processing proceeds to step S180 in this case.

At step S180, valve control section 220 determines whether or not the difference value is smaller than −ε, which is a minus value of permissible error ε. When the determination result indicates that the difference value is less than −ε (step S180: Yes), the processing proceeds to step S190. For example, when the measured oil pressure is 290 kPa, the difference value is −20 kPa and is less than the minus value of permissible error E of −13.5 kPa. Therefore, the processing proceeds to step S190 in this case.

Valve control section 220 closes electrically controlled oil-cooler bypassing valve 130 at step S190. Since the oil that circulates inside the engine flows through bypass oilway 150 that bypasses oil cooler 140 when electrically controlled oil-cooler bypassing valve 130 is closed, the oil is not cooled by oil cooler 140. Then, the processing proceeds to step S140. By way of an example, in order for the oil having bypassed oil cooler 140 to fully permeate the engine after electrically controlled oil-cooler bypassing valve 130 is closed, a predetermined wait time is elapsed before the processing proceeds to step S140.

Meanwhile, the processing is ended when the difference value is not less than −ε (step S180: No). For example, when the measured oil pressure is 275 kPa, the difference value is −5 kPa and is not less than −ε=−13.5 kPa. Therefore, the processing is ended in this case.

According to oil pressure control apparatus 100 of the present disclosure, the proper oil pressure of the engine oil depending on the engine speed and the fuel injection quantity can be secured. Accordingly, even when the hydraulic circuit malfunctions, damage to the engine can be mitigated and the durability reliability can be increased.

In the configuration disclosed in PTL 1, the engine oil is not cooled and the oil pressure is not raised when the oil temperature is low. Therefore, there is a problem in that the oil pressure of the engine oil cannot be the proper oil pressure when the oil temperature is low. In contrast to this, the engine oil is cooled and the oil pressure is raised in the present disclosure even when the oil temperature is low. Therefore, the oil pressure of the engine oil can be the proper oil pressure even when the oil temperature is low.

Additionally or alternatively, the oil temperature is not lowered when the proper oil pressure is already secured according to oil pressure control apparatus 100 of the present disclosure. Therefore, excellent fuel efficiency can be secured since it is possible to avoid an increase in friction between the engine members due to unnecessarily lowering the oil temperature.

Moreover, a temperature sensing section and a pressure sensing section disclosed in PTL 1 measure the pressure and the temperature of an oilway at the upstream side from an oil cooler (see FIGS. 2 and 3), and do not measure the pressure and the temperature of a main gallery. In contrast to this, oil pressure sensor 160 is disposed, for example, in cylinder block oil gallery 170 in oil pressure control apparatus 100 of the present disclosure. Accordingly, it is possible to measure the oil pressure at a position where securing the oil pressure is needed more and to control such that the oil pressure is the proper oil pressure in oil pressure control apparatus 100 of the present disclosure.

Other Embodiment

The target oil pressure of the engine oil corresponding to the engine speed and the fuel injection quantity is determined using the lookup table in the first embodiment. Alternatively, the target oil pressure may also be determined using a calculation formula based on the engine speed and the fuel injection quantity.

ECU 210 and valve control section 220 are disposed as separate sections in the first embodiment. Alternatively, another embodiment in which ECU 210 and valve control section 220 are integrated is also possible.

The engine oil that circulates inside the engine flows through oil cooler 140 when electrically controlled oil-cooler bypassing valve 130 is opened in the first embodiment. Meanwhile, the oil that circulates inside the engine flows through bypass oilway 150 that bypasses oil cooler 140 when electrically controlled oil-cooler bypassing valve 130 is closed. Alternatively, another embodiment in which the engine oil that circulates inside the engine flows through oil cooler 140 when electrically controlled oil-cooler bypassing valve 130 is closed is also possible. In this case, the engine oil that circulates inside the engine flows through bypass oilway 150 that bypasses oil cooler 140, when electrically controlled oil-cooler bypassing valve 130 is opened.

The state of electrically controlled oil-cooler bypassing valve 130 is changed between an opened state or a closed state in the first embodiment. Alternatively, another embodiment is also possible in which the extent of how much electrically controlled oil-cooler bypassing valve 130 is opened is adjusted depending on the magnitude of the difference value computed by subtracting the measured oil pressure from the target oil pressure. In this case, only part of the engine oil that circulates inside the engine is cooled by oil cooler 140. This makes it possible to control the oil temperature and the oil pressure more smoothly.

Permissible error ε is a predetermined proportion (e.g., 5%) of the target oil pressure in the first embodiment. Alternatively, another embodiment is also possible in which permissible error ε is an error determined depending on the target oil pressure and the engine speed.

The features described in the present disclosure are comprehensively explained in the flowchart illustrated in FIG. 2. The order of performed steps in the flowchart may be changed, or some of the steps in the flowchart may be omitted.

This application is based on Japanese Patent Application No. 2016-229138, filed on Nov. 25, 2016, the disclosure of which is incorporated herein by reference in its entirety.

INDUSTRIAL APPLICABILITY

The oil pressure control apparatus according to the present disclosure is suitable to be used in the vehicle in which an engine is mounted.

REFERENCE SIGNS LIST

100 Oil pressure control apparatus
110 Oil pan
120 Oil pump
130 Electrically controlled oil-cooler bypassing valve
140 Oil cooler
150 Bypass oilway
160 Oil pressure sensor
170 Cylinder block oil gallery
210 ECU
220 Valve control section
222 Lookup table storage section

What is claimed is:

1. An oil pressure control apparatus, comprising:
    an oil cooler that cools engine oil that circulates in a hydraulic circuit of an engine;
    a bypass oilway that bypasses the oil cooler;
    an oil-cooler bypassing valve that switches a channel of the engine oil between a channel through the oil cooler and a channel through the bypass oilway;
    an oil pressure sensor that measures a first oil pressure that is an oil pressure of the engine oil; and
    a valve control section that performs operations including opening and closing of the oil-cooler bypassing valve so as to reduce a magnitude of a difference value between the first oil pressure and a second oil pressure that is a target oil pressure determined based on an engine speed and a fuel injection quantity of the engine,
    wherein the valve control section performs one of the operations of opening and closing of the oil-cooler bypassing valve when the magnitude of the difference value is equal to or greater than a predetermined proportion of the second oil pressure, and
    wherein the valve control section does not perform the operations of opening or closing of the oil-cooler bypassing valve when the magnitude of the difference value is less than the predetermined proportion of the second oil pressure.

2. The oil pressure control apparatus according to claim 1, wherein
    the oil pressure sensor is disposed downstream of the bypass oilway and the oil cooler.

3. The oil pressure control apparatus according to claim 2, wherein
    the oil pressure sensor is disposed in a cylinder block oil gallery of the engine.

4. The oil pressure control apparatus according to claim 1, wherein
    the valve control section obtains the engine speed and the fuel injection quantity of the engine from an engine control unit (ECU) of a vehicle in which the engine is mounted.

5. The oil pressure control apparatus according to claim 1, wherein
    the valve control section determines the second oil pressure using a lookup table specifying the target oil pressure corresponding to the engine speed and the fuel injection quantity of the engine.

* * * * *